United States Patent [19]

Yamamoto et al.

[11] Patent Number: 5,212,630
[45] Date of Patent: May 18, 1993

[54] PARALLEL INVERTER SYSTEM

[75] Inventors: Yushin Yamamoto; Joji Kawai, both of Kobe, Japan

[73] Assignee: Mitsubishi Denki Kabushiki Kaisha, Tokyo, Japan

[21] Appl. No.: 809,572

[22] Filed: Dec. 18, 1991

[30] Foreign Application Priority Data

Dec. 19, 1990 [JP] Japan .................................. 2-403589

[51] Int. Cl.$^5$ .......................................... H02M 7/00
[52] U.S. Cl. ........................................ 363/71; 363/65
[58] Field of Search ............................ 363/71, 39–41, 363/95, 65; 307/58, 82, 87

[56] References Cited

U.S. PATENT DOCUMENTS

| | | | |
|---|---|---|---|
| 4,276,590 | 6/1981 | Hansel et al. | 363/71 |
| 4,677,535 | 6/1987 | Kawabata et al. | 363/65 |
| 4,802,079 | 1/1989 | Mizoguchi | 363/71 |
| 4,947,310 | 8/1990 | Kawabata et al. | 363/71 |
| 5,038,265 | 8/1991 | Paladel | 363/65 |
| 5,047,909 | 9/1991 | Hosoda | 363/40 |

FOREIGN PATENT DOCUMENTS 53-36137  9/1978  Japan .................................. 363/71
56-13101  3/1981  Japan .................................. 363/71

OTHER PUBLICATIONS

"Parallel Operation of Voltage Source Inverter" Conference Record of the 1986 I.A.S. Annual Meeting; pp. 542–548; presented Sep. 28–Oct. 3, 1986.

Primary Examiner—Steven L. Stephan
Assistant Examiner—Matthew Nguyen
Attorney, Agent, or Firm—Leydig, Voit & Mayer

[57] ABSTRACT

A parallel inverter system has a plurality of AC output inverters of an instantaneous voltage control type, a bus for connecting outputs of the inverters to a load so as to share the load current, a detection circuit for detecting a cross current component in a current flowing among the inverters, and an instantaneous voltage control circuit for controlling the output voltages of the inverters. In response to a signal in accordance with the detected cross current component from the detection circuit, the voltage control circuit inserts a virtual impedance between the inverters so as to suppress cross current.

8 Claims, 9 Drawing Sheets

PARALLEL INVERTER SYSTEM

BACKGROUND OF THE INVENTION

1. FIELD OF THE INVENTION

The present invention relates to a power supply system in which a plurality of AC output inverting devices like inverters are connected and operated in parallel with respect to common load, and more particularly to a means for controlling the current balance between inverting devices for use in the system.

2. DESCRIPTION OF THE RELATED ART

FIG. 10 shows a schematic view of a parallel operational system of a conventional AC output inverter disclosed in, for example, Japanese Patent Publication Nos. 53-36137 and 56-13101.

Referring to FIG. 10, a first inverter device 11 operates in parallel with a second inverter device 12, which has like construction, through an output bus 13 and supplies electric power to a load 14. The first inverter device 11 is mainly composed of an inverter body 110, a reactor 111 and a condenser 112 serving as a filter. The first inverter device 11 power, and is connected to the output bus 13 through an output switch 113a. In order to operate the first and second inverter devices 11 and 12 in parallel, a detection signal $I_{1a}$ is obtained from an output current $I_1$ of the first inverter device 11 by a current transformer (CT) 120a, and a difference between the detection signal $I_{1a}$ and a detection signal $I_{2a}$ similarly obtained from the second inverter device 12, that is, a signal $\Delta I_1$ corresponding to cross current is obtained by a cross current detector 151. Then, two orthogonal voltage vectors $E_A$ and $E_B$ are generated by a phase shifter 150, and a reactive power corresponding component $\Delta Q$ and an active power corresponding component $\Delta P$ are obtained from the signal $\Delta I_1$ by arithmetic circuits 152 and 153, respectively. A voltage control circuit 143 performs pulse width modulation for the inverter body 110 through a PWM circuit 140 based on signals from a voltage setting circuit 17 and a voltage feedback circuit 130, thereby controlling the internal voltage.

The above reactive power corresponding component $\Delta Q$ is supplied as a supplementary signal to the voltage control circuit 143, and the internal voltage of the inverter body 110 is adjusted by at most several percent so that $\Delta Q$ becomes 0.

On the other hand, the active power corresponding component $\Delta P$ is input to a reference oscillator 155 through an amplifier 154 as a component of a PLL circuit, and the phase of the internal voltage of the inverter body 110 is controlled by finely adjusting the frequency of the reference oscillator 155 so that $\Delta P$ becomes 0.

Since the voltage and the phase are thus controlled so that both $\Delta Q$ and $\Delta P$ become 0, no cross current exists between the two inverters and stable load sharing is achieved.

However, the conventional parallel operational system of inverters has the following three problems. First, since shared currents are balanced by controlling the phase and an average value of the internal voltages of the inverters, it is difficult to improve the response speed of control, and, in particular, it is impossible to control instantaneous cross current. Secondly, since a filter is necessary to detect an active component and a reactive component of the cross current separately, the cross current cannot be controlled at high speed. Therefore, there is a limit in applying the system to high speed voltage control, for example, instantaneous waveform control which ensures that an output of the inverter a sine wave of high quality with little distortion. Thirdly, since the active component and the reactive component of the cross current are separately controlled, the control circuit is complicated.

SUMMARY OF THE INVENTION

Accordingly, an object of the present invention is to provide a parallel inverter system capable of balancing shared currents at high speed without separating the cross current into an active component and a reactive component.

According to an aspect of the present invention, there is provided a parallel inverter system which comprises a plurality of AC output inverters of an instantaneous voltage control type, a bus for connecting outputs of the plurality of inverters to a load so as to share the load current, a first detection means for detecting a cross current component of a current flowing among the inverters, and a control means for controlling the output voltages of the inverters so as to suppress the cross current component detected by the first detection means.

DESCRIPTION OF THE PREFERRED EMBODIMENTS

Figure 1:
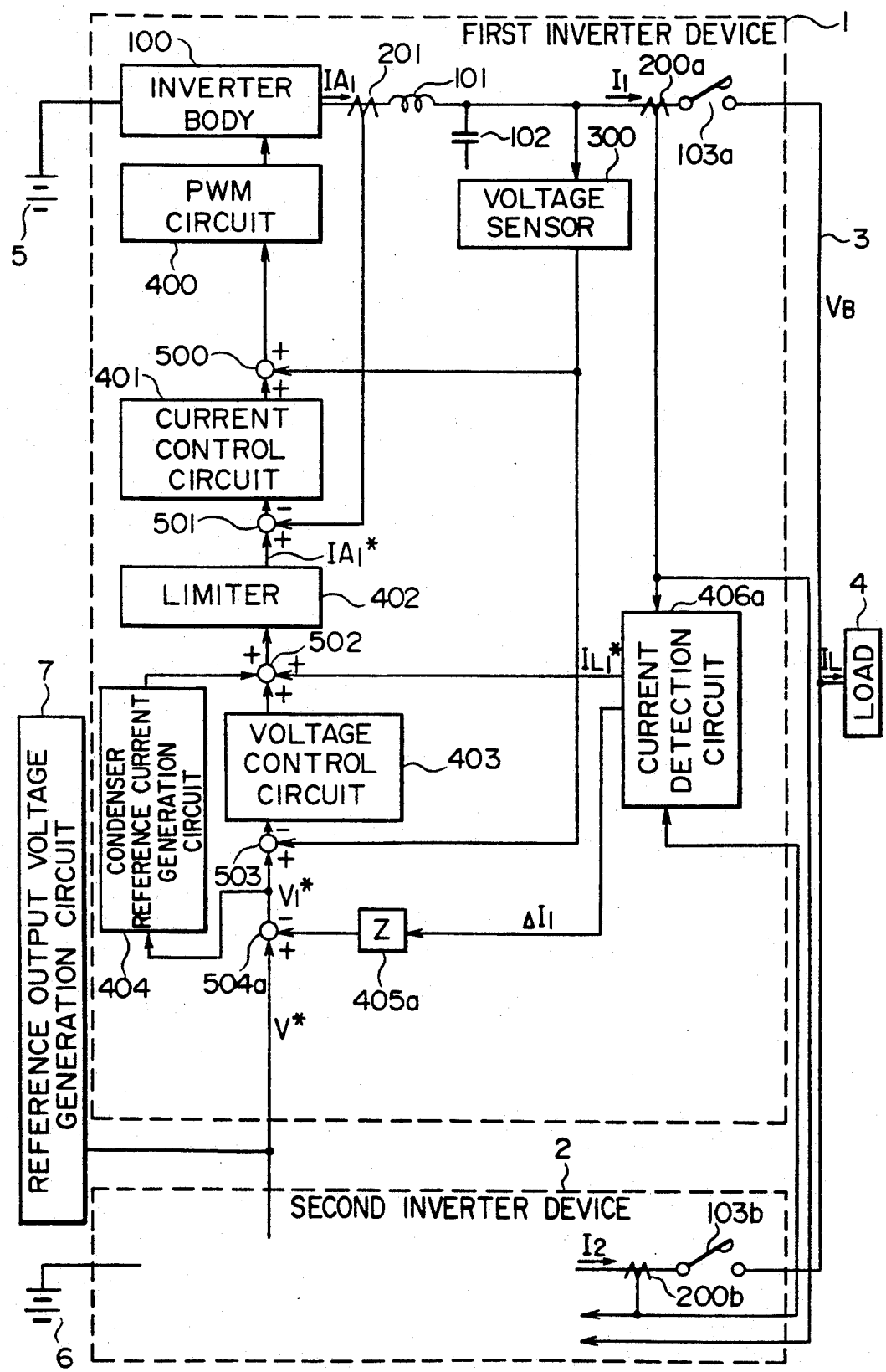
FIG. 1 is a block diagram of a parallel inverter system according to a first embodiment of the present invention.

Referring to FIG. 1, a first inverter device 1 operates in parallel with a second inverter device 2, which is briefly illustrated and has the same construction, through an output bus 3, and supplies electric power to a load 4. Numerals 5, 6 and 7 denote a DC power supply connected to the first inverter device 1, a DC power supply connected to the second inverter device 2, and a reference output voltage generation circuit for generating a voltage command valve for the output bus 3.

Numerals after 100 denote components of the inverter devices 1 and 2. The numerals with no subscript or with the subscript "a" denote components of the first inverter device 1, and the numerals with the subscript "b" denote components of the second inverter device 2.

An inverter body 100 is composed of semi arc-suppressing elements, for example, transistors or MOSFETs capable of performing high frequency switching and may be a three-phase bridge inverter shown in FIG.

Figure 2A:
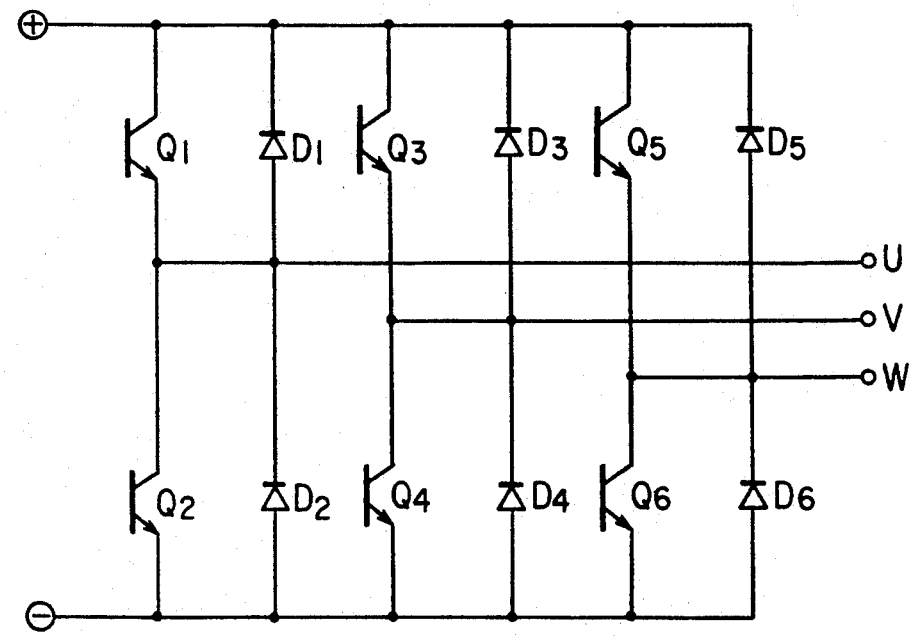
FIGS. 2A and 2B each are a circuit diagram of an inverter for use in the present invention.
Figure 2B:
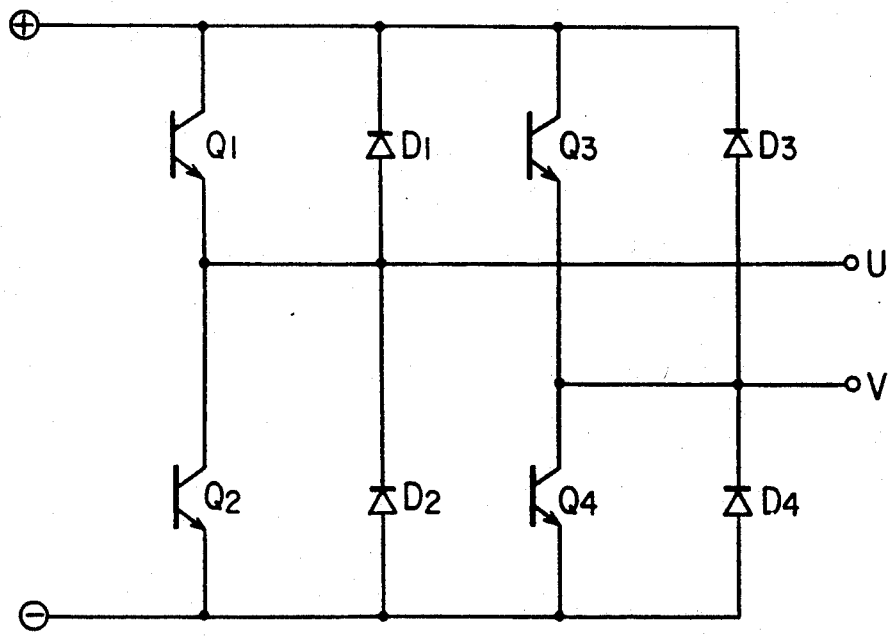

2A or a single-phase bridge inverter shown in FIG. 2B arms of which are switched at high frequency of approximately ten or several hundreds of times as high as an output frequency (for example, 60 Hz). The inverter body inverts DC voltage into high-frequency AC voltage in the shape of a rectangular wave including a sine fundamental wave. Numerals 101 and 102 denote a reactor and a condenser constituting a low-pass filter, each of which removes harmonics from the high-frequency AC voltage in the shape of a rectangular wave generated by the inverter body 100, obtains an output voltage in a sine wave, and is connected to the output bus 3 through an output switch 103a.

Current detectors 200a and 201 detect an output current $I_1$ of the first inverter device 1 and an output current $I_{A1}$ of the inverter body 100, respectively. A voltage detector 300 detects a voltage of the condenser 102, that is, an output bus voltage in the parallel operation of the inverter devices 1 and 2.

A PWM circuit 400 for determining the timing of switching of the inverter body 100 is, for example, a triangular wave comparison PWM circuit which makes the inverter body 100 perform switching in response to the crossing of a voltage command signal for a fundamental wave to be output from the inverter body 100 and a triangular wave carrier. A current control circuit 401 controls the output current $I_{A1}$ of the inverter body 100, a limiter circuit 402 limits an output current command value of the inverter body 100, and a voltage control circuit 403 controls the voltage of the condenser 102. A condenser reference current generation circuit 404 outputs a current value to be supplied to the condenser 102 in order to generate a desired output voltage. A virtual impedance circuit 405a suppresses cross current by virtually inserting an impedance Z between the first and second inverter devices 1 and 2. A current detection circuit 406a detects the cross current output from the first inverter device 1 and a load current value to be shared. Numerals 500, 501, 502, 503 and 504a denote adders and subtracters.

The second inverter deice 2 has the same construction as that of the first inverter device 1, and the outputs of the first and second inverter devices 1 and 2 are connected in parallel through the output bus 3. Numerals 103b and 200b denote an output switch to the second inverter device 2 and a current sensor for detecting an output current $I_2$ of the second inverter device 2.

Figure 3:
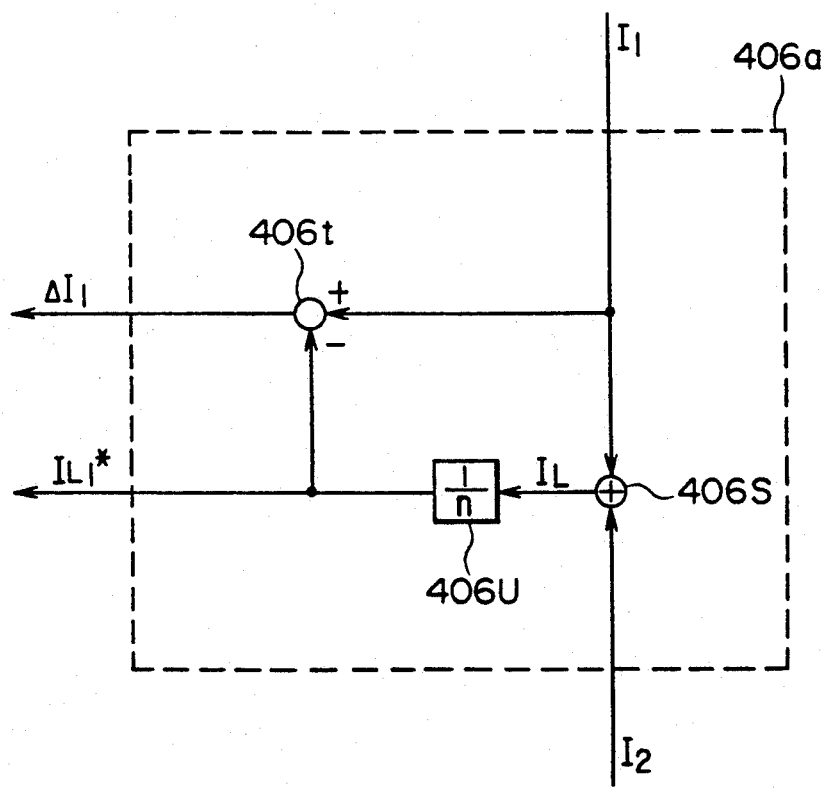
FIG. 3 is a block diagram of a current detection circuit in the first embodiment.

FIG. 3 is a detailed block diagram of the current detection circuit 406a. Numerals 406s and 406t denote an adder and a subtracter, respectively. Numeral 406u denotes an amplifying circuit having a gain of 1/n when the number of inverter devices disposed in parallel is n. A load current $I_L$ is found by adding the output current $I_1$ of the first inverter device 1 and the output current $I_2$ of the second inverter device 2 in the adder 406s, and a value $I_L/n$ is calculated by inputting a signal corresponding to the load current $I_L$ to the amplifying circuit 406u to divide the load current $I_L$ by the number of parallel inverters n (n=2 in this embodiment), and output as a load current $I_{L1}^*$ to be shared by the first inverter device 1. Furthermore, a difference between the output current $I_1$ of the first inverter device 1 and the current $I_{L1}^*$ to be shared, that is, a cross current $\Delta I_1$ (=$I_1 - I_{L1}^*$) is calculated and output by the subtracter 406t.

Operations of the parallel inverter system will be now described. Each of the inverter devices 1 and 2 is formed with a current minor loop. The current control circuit 401 outputs a voltage to be applied to the reactor 101 so that an output current $I_{A1}$ of the inverter body 100 fed back by the current sensor 201 agrees with a current command $I_{A1}^*$ from the limiter circuit 402. Since the condenser 102 and the voltage caused by the second inverter device 2 are present on the output bus 3, it is necessary that the inverter body 100 generates the total of the voltage of the output bus 3 and the voltage to be applied to the reactor 101 in order to apply a desired voltage to the reactor 101. Therefore, the voltage of the condenser 102 detected by the voltage sensor 300 and the output of the current control circuit 401 are added by the adder 500 and supplied as a voltage command to the PWM circuit 400.

The condenser reference current generation circuit 404 generates a sine wave reference current signal as a current to flow in the condenser 102, which is advanced by 90° from a voltage command $V_1^*$ of the condenser 102 in accordance with the capacity of the condenser 102. The voltage command $V_1^*$ of the condenser 102 can be obtained by the output of the subtracter 504a as described below. A deviation between the voltage command $V_1^*$ of the condenser 102 and the voltage of the condenser 102 detected by the voltage sensor 300 is calculated by the subtracter 503, and the voltage control circuit 403 to which the deviation is input outputs a correction current signal to be output from the inverter body 100 in order to reduce the deviation.

The outputs of the condenser reference current generation circuit 404 and the voltage control circuit 403 and a shared load current command value $I_{L1}^*$ of the first inverter device 1 output from the current detection circuit 406a are added by the adder 502, and the result of the addition is limited by the limiter circuit 402, thereby obtaining an output current command value $I_{A1}^*$ of the inverter body 100. Therefore, no-load voltage is obtained if the inverter body 100 supplies a current to be applied to the condenser 102 in the no-load state. In this case, the voltage control circuit 403 corrects an excess or a shortage of the output of the condenser reference current generation circuit 404 which is caused by the error of the current control or the difference between a design value and an actual value of the capacity of the condensed 102. Subsequently, when the load 4 is applied, a command to share the half of the load current $I_R$ is given from the current detection circuit 406a to the current minor loops of the inverter devices 1 and 2, and then the inverter devices 1 and 2 each share the half of the load current $I_L$. The limiter circuit 402 limits the command value to the current control circuit 401 less than an allowable current value of the inverter body 100 so that the inverter body 100 does not supply excess current, such as rush current when the load is actuated.

According to the above construction, the inverter devices 1 and 2 are protected from excess current by their respective minor loops, and the output voltage can be always kept a sine wave by promptly catching up with the distortion and rapid change of the load current. This method is characterized in an extremely prompt response since the above control is performed in every switching of the high frequency PWM in the inverter devices. For example, since a control operation is performed in every 100 μsec when a switching frequency is 10 kHz, transition with respect to disturbance, such as rapid change in the load, is completed in the period of at most approximately ten times as long as 100 μsec, and thus excellent control performance can be obtained.

When the response and precision of the voltage control systems of the first and second inverter devices 1 and 2 are just the same, the above control system can remove cross current. However, it is actually difficult due to differences in precision of components, the control gain, the main circuit constant and so on to carry out a stable parallel operation of inverter devices with causing little cross current. For example, if the voltage sensors of the first and second inverter devices 1 and 2 have errors of −0.5% and +0.5%, respectively, the output voltage difference ΔV in the separate operation of the inverter devices 1 and 2 is 1%. If it is assumed that the wire impedance between the inverter devices 1 and 2 is less than 1%, the cross current of more than 100% flows.

The present invention suppresses the cross current by constructing a control circuit as if there was an impedance with respect only to the cross current which flows between inverter devices. When it is assumed that a cross current $\Delta I_1$ is obtained from $I_1-I_{L1}^*$ and a transfer function of a virtual impedance is Z, the cross current suppression virtual impedance circuit 405a calculates $\Delta I_1 \times Z$, and an obtained signal is subtracted from the output $V^*$ of the reference output voltage generation circuit 7 by the subtracter 504a so as to obtain a voltage command $V_1^*$ to the condenser 102. The voltage of the condenser 102 instantaneously follows the voltage command $V_1^*$ through the above voltage control system.

Figure 4:
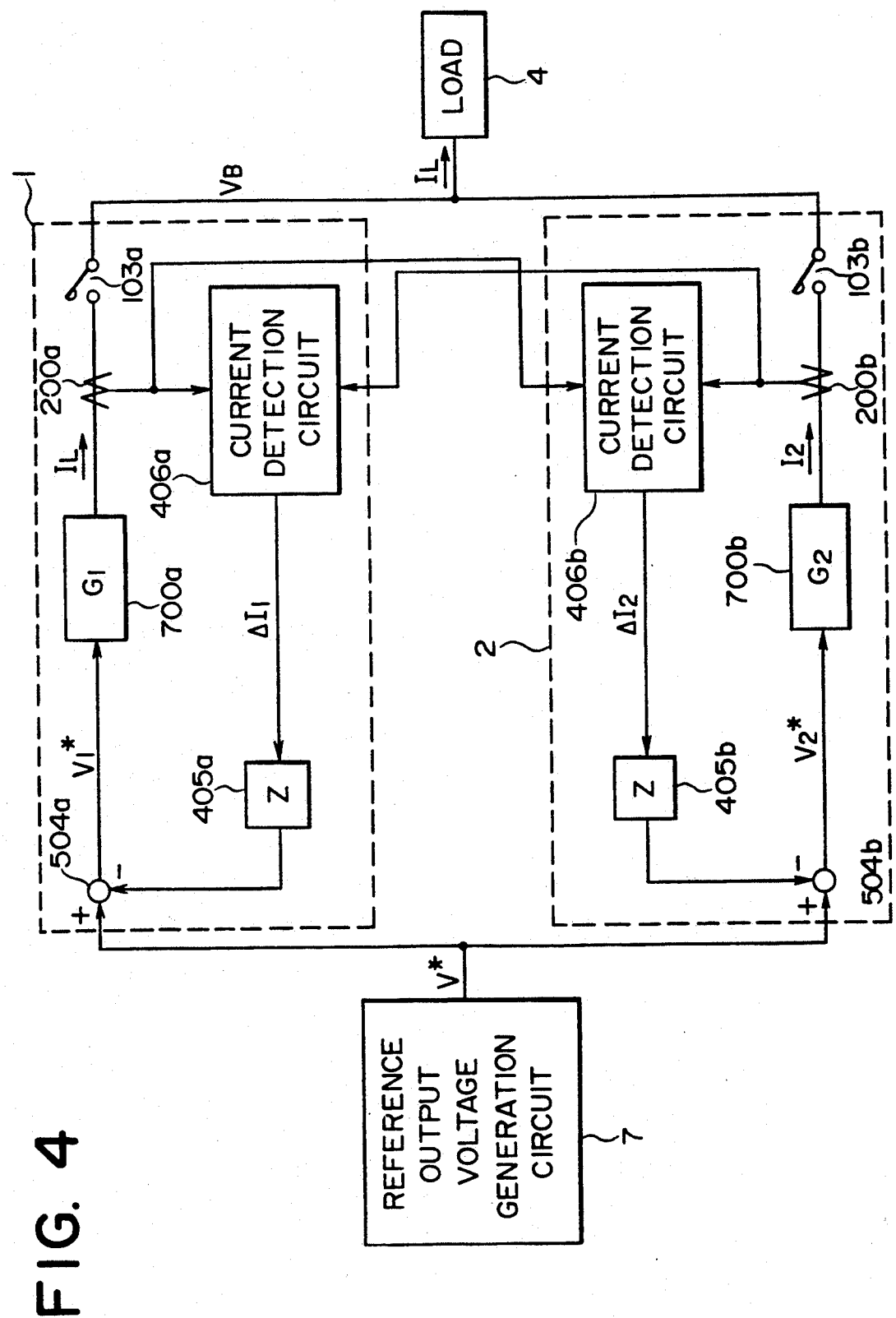
FIG. 4 is a simplified block diagram of the system shown in FIG. 1.

FIG. 4 is a block diagram which simplifies the parallel inverter system shown in FIG. 1. It is described with reference to FIG. 4 that the inverter devices 1 and 2 each have an output impedance Z with respect only to cross current and operate as a voltage source having low impedance with respect to current components other than the cross current. Numerals 700a and 700b denote transfer functions of the first and second inverter devices 1 and 2 from the voltage command values $V_1^*$ and $V_2^*$ to output voltages, respectively. The following variables will now be defined though some of them are already used above:

$V_B$: output bus voltage
$V^*$: output voltage command value
$V_1^I$: first inverter condenser voltage command value
$V_2^*$: second inverter output current
$\Delta I_1$: first inverter cross current $(=I_1-I_L/2)$
$\Delta I_2$: second inverter cross current $(=I_2-I_L/2)$
$G_1$: first inverter voltage control system transfer function
$G_2$: second inverter voltage control system transfer function
Z : cross current suppression virtual impedance value Then, relational expressions showing the effect of the virtual impedance for suppressing the cross current are derived by using the above variables.

According to the Kirchhoff's law, the following expression is valid:

$$I_L = I_1 + I_2 \tag{1}$$

$\Delta I_1$ and $\Delta I_2$ are obtained by the following expressions according to the expression (1):

$$\Delta I_1 = I_1 - I_L/2 = (I_1 - I_2)/2 \tag{2}$$

$$\Delta I_2 = I_2 - I_L/2 = (I_2 - I_1)/2 \tag{3}$$

Therefore, $$\Delta I_2 = -\Delta I_1 \tag{4}$$

According to FIG. 4 and the expression (4), $V_1^*$ and $V_2^*$ are found according to the following expressions:

$$V_1^* = V^* - Z \times \Delta I_1 \tag{5}$$

$$V_2^* = V^* - Z \times \Delta I_2 = V^* + Z \times \Delta I_1 \tag{6}$$

The definition of $G_1$ and $G_2$ makes the following expressions hold true:

$$V_B = V_1^* \times G_1 \tag{7}$$

$$V_B = V_2^* \times G_2 \tag{8}$$

The expressions (5) to (8) lead to the following expressions:

$$V_B = V^* \times G_1 - Z \times \Delta I_1 \times G_1 \tag{9}$$

$$V_B = V^* \times G_2 + Z \times \Delta I_1 \times G_2 \tag{10}$$

$\Delta I_1$ is found according to the expressions (9) and (10) as follows:

$$\Delta I_1 = \frac{V^*}{Z} \times \frac{G_1 - G_2}{G_1 + G_2} \tag{11}$$

Furthermore, $V_B$ is found according to the expressions (9) and (10) as follows:

$$V_B = V^* \times \frac{G_1 + G_2}{2} - Z \times \Delta I_1 \times \frac{G_1 - G_2}{2} \tag{12}$$

The expression (11) reveals that the cross current can be suppressed by the virtual impedance value Z. Since $G_1$ and $G_2$ can make the gain almost 1 in the output frequency by using the above instantaneous voltage control systems, the expression (11) can be approximated by the following expression:

$$\Delta I_1 \approx \frac{V^* \times (G_1 - G_2)}{2 \times Z} \tag{13}$$

If it is assumed that a difference between the output voltages of the inverter devices 1 and 2 is ΔV in the case of the separate operation, the expression (13) is replaced with the following expression:

$$\Delta I_1 \approx \frac{\Delta V}{2 \times Z} \tag{14}$$

For example, if ΔV is 1% and Z is 50%, a cross current is $\Delta V/(2 \times Z) = 1/100 = 1\%$.

By substituting the expression (13) for $\Delta I_1$ of the second term in the right side of the expression (12), the following expression is obtained:

$$Z \times \Delta I_1 \times \frac{G_1 - G_2}{2} \approx \frac{\{V^* \times (G_1 - G_2)\}^2}{4 \times V^*} = \frac{(\Delta V)^2}{4 \times V^*} \tag{15}$$

Since ΔV is small, approximately 1%, it can be thought that $(\Delta V)^2 = 0$. Therefore, the first term is only left in the right side of the expression (12), resulting in the following expression.

$$V_B \approx V^* \times \frac{G_1 + G_2}{2} \tag{16}$$

The expression (16) reveals that the bus voltage $V_B$ in the parallel operation of the inverter devices 1 and 2 corresponds to an average output voltage value of the inverter devices 1 and 2 in the separate operation, and is not influenced by the virtual impedance value Z.

Z may be any transfer function if it has an appropriate impedance value to suppress cross current in the output frequency of the impedance circuit 405a. For example, Z functions as a resistor in the case of a comparison circuit, as a reactor in the case of a differential circuit, and as a condenser in the case of an integral circuit. In the case of a combination circuit of comparison, differential and integral, Z functions as a circuit which combines a resistor, a condenser and a reactor. Furthermore, Z can stably suppress cross current even in a circuit having a nonlinear element, such as a sign asymmetric limiter it it has an appropriate impedance value to suppress the cross current in the output frequency.

Figure 5:
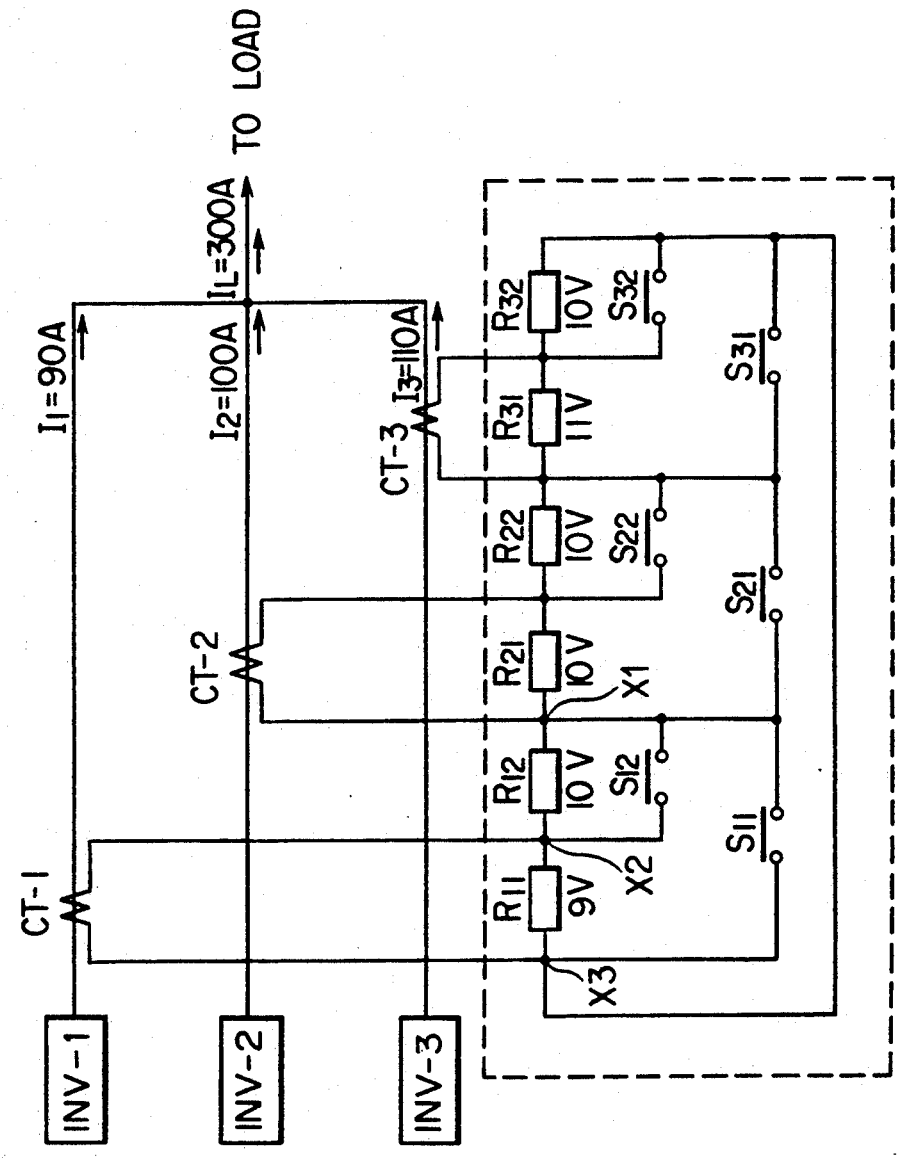
FIG. 5 is a circuit diagram of the current detection circuit.

FIG. 5 shows a current detection circuit for detecting cross current and a current to be shared by the inverter devices. This circuit is of a well-known type and its operation will be briefly described. For example, it is assumed that three inverter devices INV-1, INV-2 and INV-3 output $I_1=90A$, $I_2=100A$, and $I_3=110A$, respectively when a load current $I_L=300A$. Output currents of the inverter devices INV-1 to INV-3 are measured by current sensors CT-1 to CT-3, and load resistors $R_{11}R_{21}$ and $R_{31}$ having the same resistor value are connected to the current sensors CT-1 to CT-3, respectively, thereby obtaining voltages of, for example, 9V, 10V and 11V. These voltages correspond to the output currents of the inverter devices INV-1 to INV-3. When the load resistors $R_{11}$, $R_{21}$ and $R_{31}$ are connected to resistors $R_{12}$, $R_{22}$ and $R_{32}$ having the same sufficient resistance value as shown in FIG. 5, a voltage of $(9+10+11)/3=10V$ is obtained in each of the resistors $R_{12}$, $R_{22}$ and $R_{32}$. This voltage corresponds to ⅓ of the load current $I_L$, that is, a value of the current to be shared by the inverter devices INV-1 to INV-3. Therefore, since a current to be shared is obtained between the points X1 and X2 and a voltage corresponding to the cross current is obtained between the points X1 and X3 in the inverter device INV-1, the current and the voltage are separately introduced into the control circuit. Furthermore, in order to stop the operation of the inverter device INV-1, a switch $S_{12}$ is turned on, the voltages of the resistors $R_{22}$ and $R_{32}$ each are set at 15 V, and all the load is shifted to the other two inverter devices INV-2 and INV-3. Then, a switch $S_{11}$ is turned on and the inverter device INV-1 is simultaneously stopped.

Although it is no mentioned in the above description that the current and the voltage are expressed in vector amount in order to simplify the description, the same relationship stands up even if they are expressed in vector amount.

Although the above-mentioned control method shown in FIG. 1 is used for a single-phase inverter, it may be applicable to a three-phase inverter if a similar control circuit is disposed in each phase or two phases of the three-phase inverter.

A second embodiment, in which the present invention is applied to a control system capable of obtaining excellent characteristics in a three-phase inverter or converter and using the synchronous rotary coordinate system with respect to the d-q axis, will now be described with reference to FIG. 6.

Figure 6:
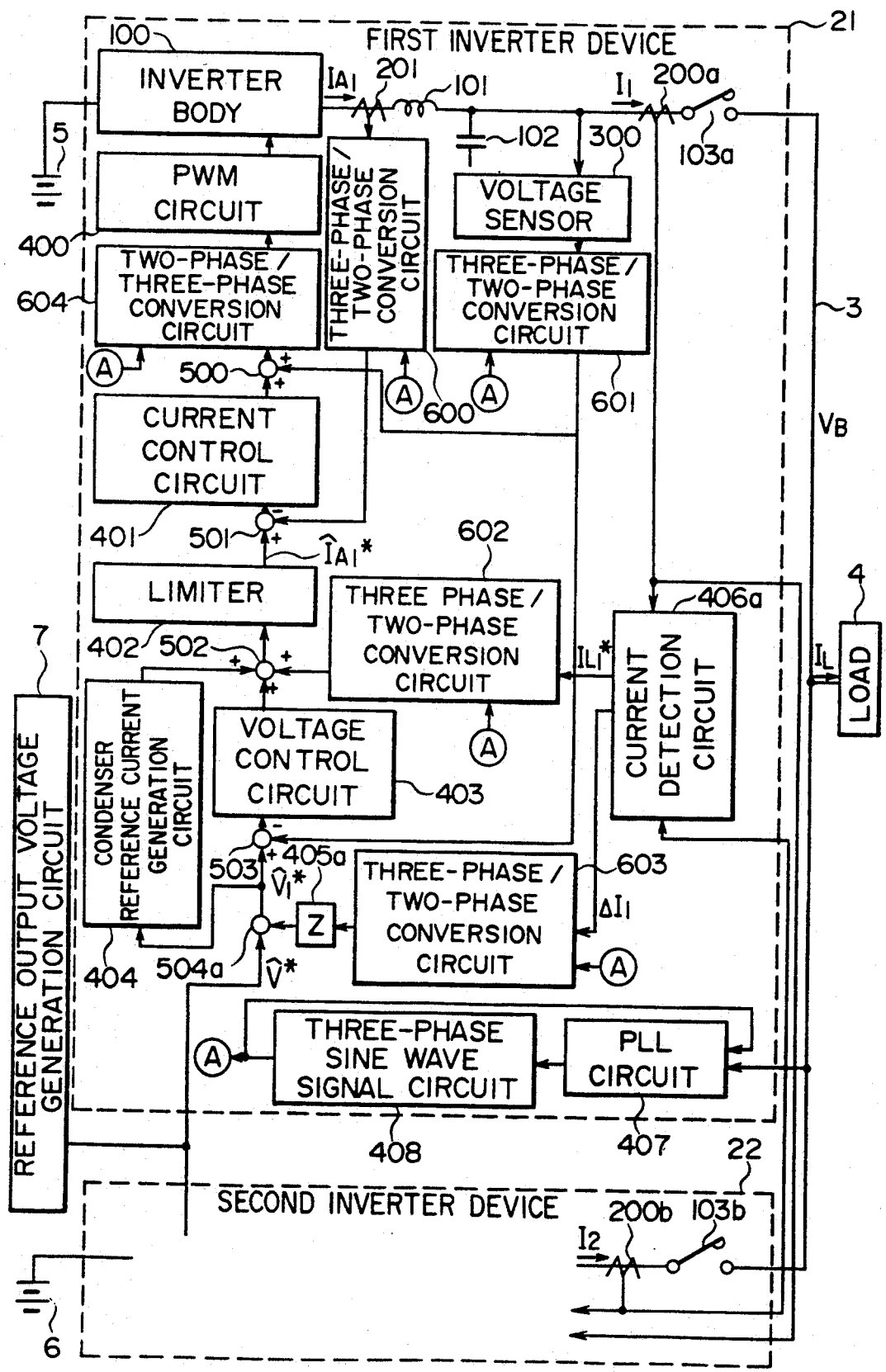
FIG. 6 is a block diagram of a second embodiment.

Although a system shown in FIG. 6 has almost the same construction as that of the first embodiment shown in FIG. 1, it is greatly different in having four three-phase/two-phase conversion circuits 600 to 603 and one two-phase/three-phase conversion circuit 604. A three-phase sine signal circuit 408 and a PLL circuit 407 for synchronizing the three-phase sine signal circuit 408 with an output bus voltage $V_B$ output the following six three-phase sine signals as the criteria for converting the uvw coordinates and the dq coordinates:

$$\left. \begin{array}{l} S_u = \sqrt{\frac{2}{3}} \sin(\omega t + \phi) \\ S_v = \sqrt{\frac{2}{3}} \sin(\omega t - 2\pi/3 + \phi) \\ S_w = \sqrt{\frac{2}{3}} \sin(\omega t + 2\pi/3 + \phi) \end{array} \right\} \tag{17}$$

$$\left. \begin{array}{l} C_u = \sqrt{\frac{2}{3}} \cos(\omega t + \phi) \\ C_v = \sqrt{\frac{2}{3}} \cos(\omega t - 2\pi/3 + \phi) \\ C_w = \sqrt{\frac{2}{3}} \cos(\omega t + 2\pi/3 + \phi) \end{array} \right\} \tag{18}$$

(wherein $\phi$ is normally 0.)

The operations of the three-phase/two-phase conversion circuits will be described. Three-phase output signals from a current sensor 201, a current detection circuit 406a and a voltage sensor 300 are representatively expressed as a matrix X=col [Xu, Xv, Xw]. By being multiplied by the following conversion matrix C, the matrix X is converted into a DC signal vector Y=col [Yd,Yq] on the d-q axis.

$$C = \begin{pmatrix} S_u & S_v & S_w \\ C_u & C_v & C_w \end{pmatrix} \tag{19}$$

$$Y = \begin{pmatrix} Y_d \\ Y_q \end{pmatrix} = C \cdot X \tag{20}$$

$$= \begin{pmatrix} S_u & S_v & S_w \\ C_u & C_v & C_w \end{pmatrix} \begin{pmatrix} X_u \\ X_v \\ X_w \end{pmatrix} \tag{21}$$

In the above expressions, the letters with the mark - on the top each designate a matrix, and the letter with on the top designates the vector amount of the d-q axis. Related lettters in the drawings are the same as above.

In such conversion, when the output voltage command V* is expressed in the following expression, $$V^* = \sqrt{2} \, E \begin{pmatrix} \sin \omega t \\ \sin(\omega t - 2\pi/3) \\ \sin(\omega t + 2\pi/3) \end{pmatrix} \tag{22}$$

the value on the d-q axis is obtained by the following expression:

$$V^* = \begin{pmatrix} V_d^* \\ V_q^* \end{pmatrix} = C \cdot V^* = \begin{pmatrix} \sqrt{3}\,E \\ 0 \end{pmatrix} \quad (23)$$

If the capacity of the condenser 102 is $C_p$, a current command d-q vector $I_c^*$ to be supplied to the condenser 102 is:

$$I_c^* = \begin{pmatrix} I_{Cd}^* \\ I_{Cq}^* \end{pmatrix} = C \cdot I_c^* \quad (24)$$

$$= C\sqrt{2}\,\omega C_p E \begin{pmatrix} \cos \omega t \\ \cos(\omega t - 2\pi/3) \\ \cos(\omega t + 2\pi/3) \end{pmatrix}$$

$$= \begin{pmatrix} 0 \\ \sqrt{3}\,\omega C_p E \end{pmatrix}$$

Thus, the three-phase reference output voltage and the reference condenser current are constant DC values on the d-q axis.

Control and calculation are carried out by using a signal converted with respect to the d-q axis in the same manner as in the first embodiment.

Since the control system of three-phases of U, V and W is of the follow-up control type, errors are likely to be caused even in the steady state, while since this control system performs the control with fixed set point, it is possible to achieve control which substantially causes few errors.

When the result of the control and calculation on the d-q axis is multiplied by an inverse conversion matrix $C^{-1}$ of the conversion matrix C expressed in the following expression by the two-phase/three phase conversion circuit 604, the result is returned to a three-phase system again and supplied to the PWM circuit 400.

$$C^{-1} = \begin{pmatrix} S_u & C_u \\ S_v & C_v \\ S_w & C_w \end{pmatrix} \quad (25)$$

Figure 7:
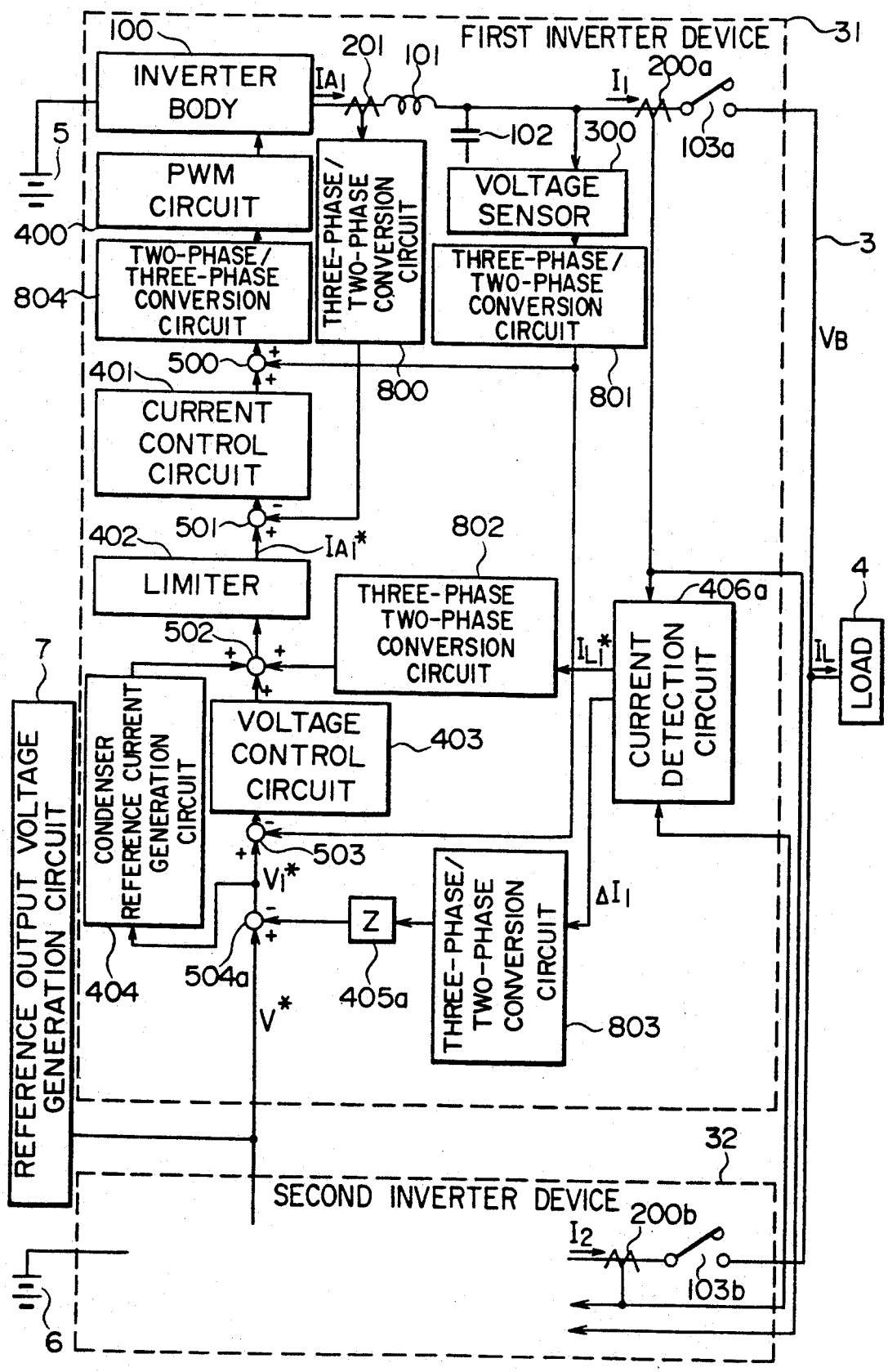
FIG. 7 is a block diagram of a third embodiment.

FIG. 7 shows a third embodiment which uses orthogonal $\alpha\beta$ coordinates instead of the dq coordinates.

Although the third embodiment has almost the same construction as that of the second embodiment, it is greatly different in that three phase/two phase conversion circuits 800 to 803 and a two-phase/three-phase conversion circuit 804 do not perform the conversion between the uvw coordinates and the dq coordinates, but the conversion between the uvw coordinates and the $\alpha\beta$ coordinates. In the conversion between the uvw coordinates and the $\alpha\beta$ coordinates, the conversion matrix $C_1$ and the inverse conversion matrix $C_1^{-1}$ obtained by setting $\omega t$ at a fixed value (for example, $\omega t = \pi/2$) in the expressions (17) and (18), and the same calculation as that in the second embodiment is performed. Since $\omega t$ is a fixed value, the three-phase sine signal circuit 408 and the PLL circuit 407 for the control on the d-q axis are not necessary.

Since the components of the conversion matrix $C_1$ and the inverse conversion matrix $C_1^{-1}$ are constants, the three-phase reference output voltage and the condenser reference current are expressed in AC on the $\alpha\beta$ coordinates, and the follow-up control similar to the control of the three phases U, V and W is performed.

Although controllability is enhanced by supplying a value of current to flow into the condenser 102 of the output filter on the inverter as a command value of the current minor loop in the above first to third embodiments, the condenser reference current generation circuit 404 in each of the embodiments may be omitted. This is because, since the voltage control circuit 403 operates so that the output voltage of the first inverter device 1 agrees with the reference output voltage $V_1^*$ and then generates a signal to replace the signal corresponding to the condenser reference current, the voltage control circuit 403 functions as a control system for the sine inverter without any trouble. In this case, the higher the amplification factor of the voltage control circuit 403 is, the smaller deviation in voltage control becomes.

Although the control circuit is of an instantaneous voltage control type having a current minor loop in the above description, if the voltage control circuit can control the output voltage at high speed without requiring any current minor loop, it is possible to stably operate AC output inverters in parallel by adding a cross current suppression virtual impedance circuit.

Figure 8:
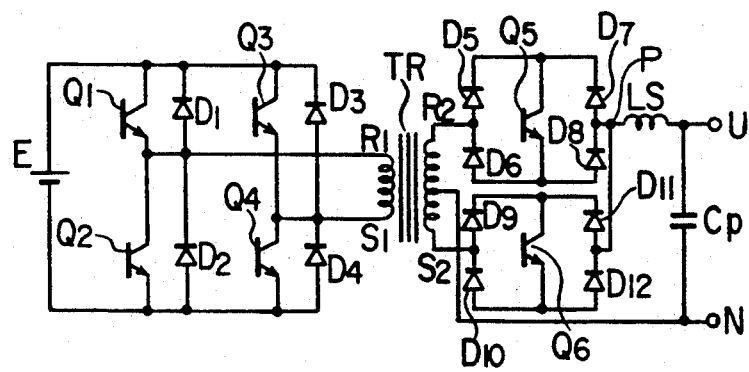
FIG. 8 is a circuit diagram of another inverter for use in the present invention.

Furthermore, although the present invention is used for the parallel operation of inverters, the principle of the present invention can be also applied to another converter capable of performing instantaneous voltage control, such as a high-frequency link converter as the combination of a high-frequency inverter and a cycloconverter for converting a direct current into a high-frequency rectangular wave and a low-frequency sine wave as shown in FIG. 8.

Figure 9:
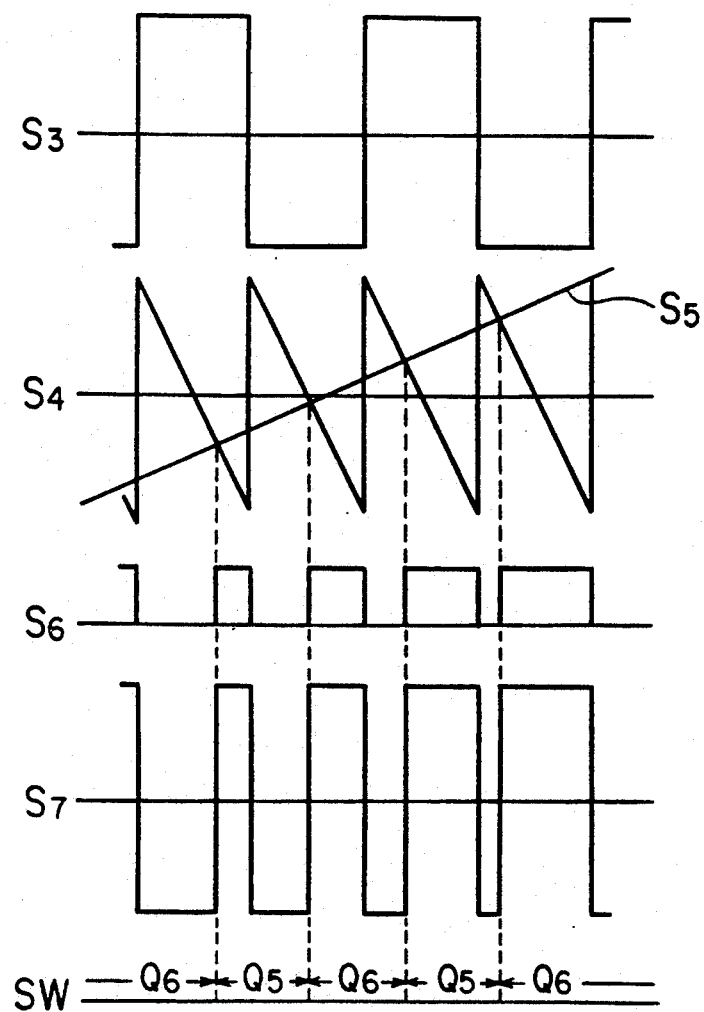
FIG. 9 is a timing chart showing the operation of the inverter shown in FIG. 8.
Figure 10:
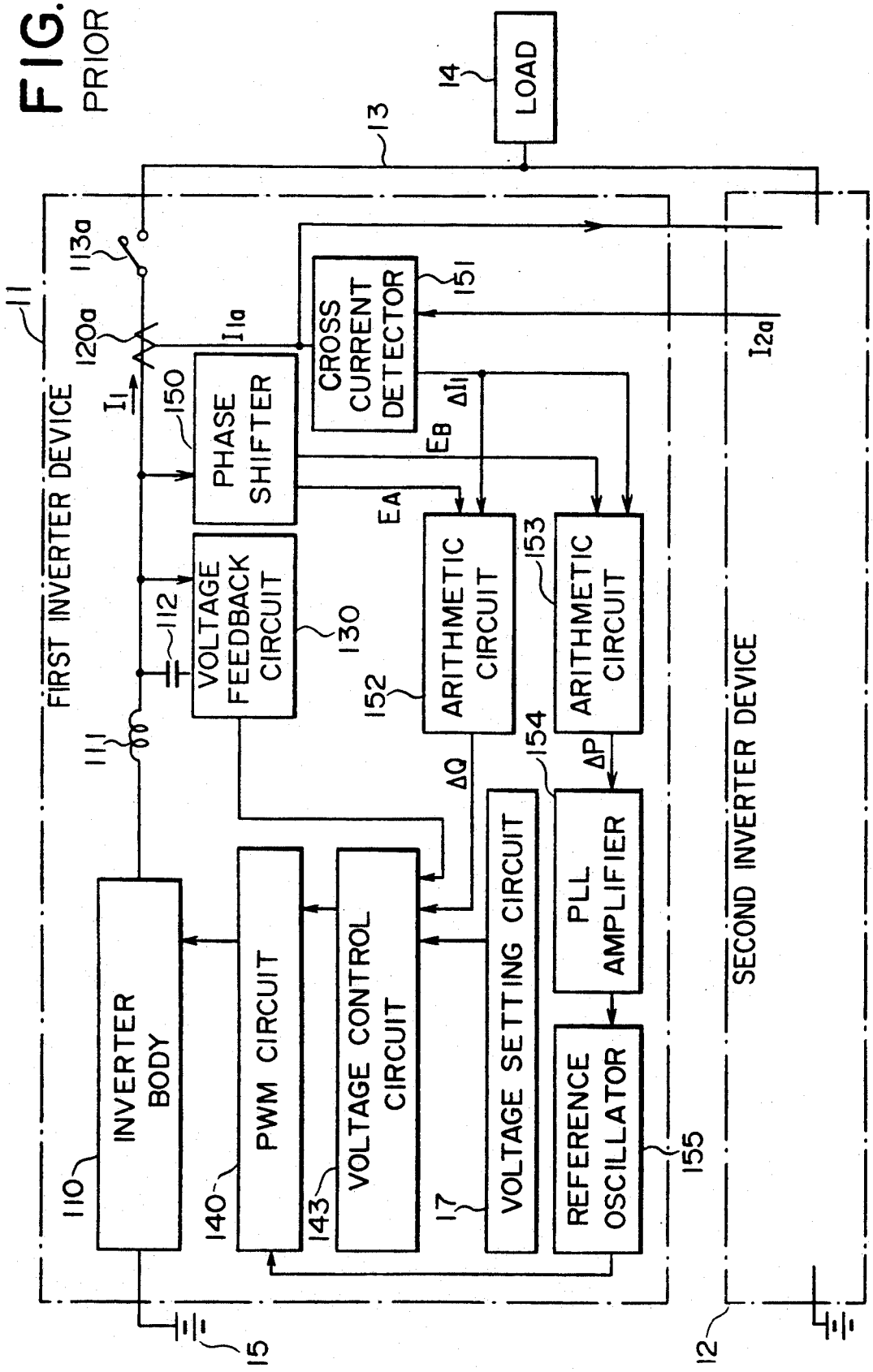
FIG. 10 is a block diagram of a conventional parallel operational system.

In the converter shown in FIG. 8, a rectangular wave $S_3$ shown in FIG. 9 is obtained on the secondary side of a transformer TR by switching among transistors $Q_1$ to $Q_4$. Then, a sawtooth wave $S_4$ in synchronization with the switching of the inverter is formed, and a signal $S_6$ which is turned on and off at the intersection of the sawtooth wave $S_4$ and an output voltage command signal $S_5$ is obtained. One of switches $Q_5$ and $Q_6$ of the cycloconverter is selected based or the signal $S_5$ and the polarity of a voltage RS of the inverter, thereby obtaining a voltage signal $S_7$ corresponding to the signal $S_5$ between N and P in FIG. 8.

As described above, the circuit shown in FIG. 8 can obtain a single-phase PWM voltage equivalent to that of the circuit shown in FIG. 2B. Furthermore, in the case of the three-phase output, a three-phase high frequency link converter using three circuits, each of which is the same as that on the secondary side of the transformer TR shown in FIG. 8, may be used.

The principle described in the above embodiments can be realized by a discrete circuit using an analog operational amplifier and so on, or software for performing digital processing by using a microprocessor or a digital signal processor.

Although two inverters having the same capacity are described above in order to simplify the description, the present invention is applicable to the parallel operation of n number of converters having different capacities. In this case, if the current sensors CT-1, CT-2 and CT-3 and the resistors $R_{11}$, $R_{21}$ and $R_{31}$ shown in FIG. 5 are changed in accordance with the capacities of the inverters and the same voltage is obtained in the terminals of the resistors $R_{11}$, $R_{21}$ and $R_{31}$ when the rated current is applied, the inverters each share the load proportional to the respective capacities thereof.

As described above, according to the present invention, a signal in accordance with cross current in a current between inverters is supplied to an instantaneous voltage control circuit for controlling an instantaneous value of output voltage. Therefore, it is possible to promptly suppress the cross current using simple circuitry.

What is claimed is:

1. A parallel inverter system, comprising:
   a plurality of AC output igniters of an instantaneous voltage control type;
   a bus for connecting outputs of said plurality of inverters to a load so as to share a load current;
   first detection means for detecting a cross current component in a current flowing among said inverters; and
   control means for controlling output voltages of said inverters to suppress the cross current component detected by said first detection means said control mans including a virtual impedance circuit which has a predetermined impedance with respect to the cross current and a low impedance with respect to current components other than the cross current.

2. A parallel inverter system according to claim 1 wherein each of said plurality of inverters switches arms of phases a plurality of times during on cycle to control an instantaneous output voltage value.

3. A parallel inverter system according to claim 1 wherein each of said plurality of inverters is a three-phase AC output inverter.

4. A parallel inverter system according to claim 3 wherein each of said plurality of inverters controls an instantaneous output voltage value based on two components of synchronous rotary coordinates.

5. A parallel inverter system according to claim 3 wherein each of said plurality of inverters controls an instantaneous output voltage value based on two components of orthogonal coordinates.

6. A parallel inverter system according to claim 1 wherein each of said plurality of inverters has a current minor loop for controlling an instantaneous output current value.

7. A parallel inverter system according to claim 6 further comprising second detection means for detecting a load current value to be shared by each of said inverters and for supplying the load current value as a current command to said current minor loop of each of said inverters.

8. A parallel inverter system, comprising:
   a plurality of AC output inverters of an instantaneous voltage control type;
   a bus or connecting outputs of said plurality of inverters to a load so as to share the load current;
   first detection means for detecting a cross current component in a current flowing among said inverters; and
   control means or controlling output voltages of said inverters including a virtual impedance circuit which as an impedance sufficient to suppress the cross current component detected by said first detection means.

* * * * *

UNITED STATES PATENT AND TRADEMARK OFFICE
CERTIFICATE OF CORRECTION

PATENT NO. : 5,212,630

DATED : May 18, 1993

INVENTOR(S) : Yamamoto et al.

It is certified that error appears in the above-identified patent and that said Letters Patent is hereby corrected as shown below:

Claim 1, col. 11, line 16, change "igniters" to --inverters--;

Claim 1, col. 11, line 27, change "mans" to --means--.

Claim 2, col. 11, line 34, change "on" to --one--.

Claim 8, col. 12, line 30, change "or" to --for--;

Claim 8, col. 12, line 32, change "as" to --has--.

Signed and Sealed this

Fourth Day of January, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,212,630

DATED : May 18, 1993

INVENTOR(S) : Yamamoto et al.

It is certified that error appears in the above-identified patent and that said Letters Patent is hereby corrected as shown below:

Claim 8, column 12, line 25, change "or" to --for--.

Signed and Sealed this

Twenty-second Day of March, 1994

*Attest:*

BRUCE LEHMAN

*Attesting Officer*   *Commissioner of Patents and Trademarks*